United States Patent [19]

Tsukamoto

[11] Patent Number: 5,233,834
[45] Date of Patent: Aug. 10, 1993

[54] PIEZO-ACTUATOR'S DISPLACEMENT MAGNIFYING MECHANISM

[75] Inventor: Masahiro Tsukamoto, Yokosuka, Japan

[73] Assignee: Nissan Motor Company, Ltd., Kanagawa, Japan

[21] Appl. No.: 782,227

[22] Filed: Oct. 24, 1991

[30] Foreign Application Priority Data

Nov. 5, 1990 [JP] Japan ................................. 2-297227

[51] Int. Cl.⁵ .......................... F15B 7/00; F16F 15/03
[52] U.S. Cl. ..................................... 60/545; 188/267; 188/319
[58] Field of Search .................. 60/595, 592; 188/267, 188/268, 299, 319; 267/140.1 R, 140.1 A, 140.14

[56] References Cited

U.S. PATENT DOCUMENTS

| | | | |
|---|---|---|---|
| 4,587,850 | 5/1986 | Moser | 188/299 X |
| 4,729,459 | 3/1988 | Inagaki et al. | 199/319 X |
| 4,858,733 | 8/1989 | Noguchi et al. | 188/267 |
| 4,946,131 | 8/1990 | Weyand | 188/268 X |
| 4,973,854 | 11/1990 | Hummel | 188/299 X |
| 5,018,606 | 5/1991 | Carlson | 188/267 |
| 5,044,474 | 9/1991 | Kock | 188/319 |

FOREIGN PATENT DOCUMENTS

61-85210 4/1986 Japan.
64-26041 1/1989 Japan.

*Primary Examiner*—Edward K. Look
*Assistant Examiner*—Hoang Nguyen
*Attorney, Agent, or Firm*—Lowe, Price, LeBlanc & Becker

[57] ABSTRACT

A piezo-actuator's displacement magnifying mechanism includes a first cylinder and a second cylinder which is smaller in diameter than the first cylinder and communicates with the same. A plunger is slidably mounted in the first cylinder. The plunger is moved by a piezo-actuator in the first cylinder when a predetermined voltage is applied to the piezo-actuator to cause the same to expand and contract. A piston is slidably mounted in the second cylinder. A reservoir is communicating with the first cylinder. A hydraulic fluid is received in the first and the second cylinder and the reservoir. The hydraulic fluid is variable in viscosity in response to electric fields to which the fluid is subjected. A fluid passage is provided between the first cylinder and the reservoir for compensating for thermal expansion/contraction of the fluid. An electrode is provided for subjecting the hydraulic fluid to electric fields in the passage according to an instruction for applying the voltage to the piezo-actuator.

4 Claims, 5 Drawing Sheets

PIEZO-ACTUATOR'S DISPLACEMENT MAGNIFYING MECHANISM

BACKGROUND OF THE INVENTION

1. Field of the Invention

The present invention relates to a piezo-actuator's displacement magnifying mechanism used, for example, in a shock absorber having its damping force variable (hereinafter referred to as the variable-damping-force shock absorber).

2. Description of the Prior Art

An example of a conventional piezo-actuator's displacement magnifying mechanism used in the variable-damping-force shock absorber is disclosed in Japanese Patent Laid-Open No. 85210/1986 (called, in Japanese language, "Tokkaisho 61-85210"), a construction of which mechanism is shown in FIG. 1.

In operation of the conventional piezo-actuator's displacement magnifying mechanism, as shown in FIG. 1, when a predetermined voltage is applied to a piezo-actuator 23 of a laminated type, the piezo-actuator 23 expands with the voltage. Such expansion of the piezo-actuator 23 slightly displaces a plunger 25 to apply a pressure to a hydraulic fluid confined in a fluid chamber 27. Such pressure is then applied to a piston 19 through the hydraulic fluid to drive the piston 19 downward, so that a damping-force control valve is controlled so as to be opened and closed. In the conventional piezo-actuator's displacement magnifying mechanism having the above construction, the plunger 25 is larger in an area (which is subjected to the pressure of the hydraulic fluid) than the piston 19. Consequently, when the plunger 25 is displaced in a longitudinal direction of the piezo-actuator 23 by a certain distance or displacement, such distance or displacement is magnified by the piston 19.

However, in the conventional piezo-actuator's displacement magnifying mechanism having the above construction, since an O-ring is mounted on each of the plunger 25 and the piston 19 to prevent the hydraulic fluid from passing through an annular clearance between: the plunger 25 and its corresponding cylinder; and that between the piston 19 and its corresponding cylinder, there is a fear that the piston 19 is displaced against a resilient force exerted by a return spring 21 under the influence of thermal expansion of the hydraulic fluid confined in the fluid chamber 27 even when no voltage is applied to the piezo-actuator 23.

In order to solve the above problem, when the O-ring mounted on the piston 19 is removed to permit the hydraulic fluid (which has been thermally expanded) to escape from the fluid chamber 27 through the annular clearance between the piston 19 and its corresponding cylinder, there is a fear that the piston 19 is not displaced even when a predetermined voltage is applied to the piezo-actuator 23 to cause the plunger 25 to apply a pressure to the hydraulic fluid (which is confined in the fluid chamber 27) so as to intend to move or displace the piston 19 downward. In this condition, even if the piston 19 happens to slightly displace, the piston 19 gradually returns to its initial position in a short time of, for example, two seconds or so.

In a conventional method for solving the above further problem, a pulse-shaped predetermined voltage is applied again to the piezo-actuator 23 to fill the fluid chamber 27 with the hydraulic fluid. However, such conventional method is poor in easiness in control, and suffers from large power consumption.

Therefore, an ideal means for solving the problems inherent in the conventional piezo-actuator and the conventional method is summarized as follows:

"Means for laying a restraint on hydraulic fluid movement only when the piezo-actuator is energized".

One of the ideal means is disclosed in Japanese Patent Laid-Open Publication No. 26041/1989 (called, in Japanese language, "Tokkaisho 64-26041"), which one lays a restraint on the hydraulic fluid movement by the use of a resilient sealing member such as O-rings and rubber sheet members only when the piston is displaced. However, such resilient sealing member is poor in durability when it is used in an opening/closing area.

The above-mentioned flow or leakage of the hydraulic fluid passing through the annular clearances between the plunger/piston and their corresponding cylinders forms a so-called annular-clearance flow of the hydraulic fluid. It is well known that a flow rate of the hydraulic fluid passing through the annular-clearance is directly proportional to a cross-sectional area of the annular clearance, while inversely proportional to both of a length of the annular clearance and the viscosity of the hydraulic fluid. There are three factors for controlling a flow rate of the hydraulic fluid passing through the annular clearance. These three factors are: the cross-sectional area of the annular clearance; length of the annular clearance; and the viscosity of the hydraulic fluid passing through the annular clearance.

The means disclosed in the above Japanese Patent Laid-Open Publication No. 26041/1989 controls a flow rate of the hydraulic fluid (which passes through the annular clearance) by controlling one of the above three factors, i.e., by controlling the cross-sectional area of the annular clearance.

SUMMARY OF THE INVENTION

Under such circumstances, the present invention was made. Of the above three factors, the present invention utilizes an easily controllable one, i.e., the viscosity of the hydraulic fluid for controlling a flow rate of the hydraulic fluid passing through the annular clearance.

Consequently, it is an object of the present invention to provide a piezo-actuator's displacement magnifying mechanism which: utilizes the viscosity of hydraulic fluid for controlling a flow rate of the hydraulic fluid passing through an annular clearance; does not use any resilient member such as O-rings and the like for controlling the flow rate of the hydraulic fluid passing through an annular clearance; lays a restraint on a flow of the hydraulic fluid passing through the annular clearance, only when a piezo-actuator is energized; appropriately compensates for thermal expansion/contraction of the hydraulic fluid; and is excellent in responsibility.

According to a first aspect of the present invention, the above object of the present invention is accomplished by providing:

a piezo-actuator's displacement magnifying mechanism, comprising:

a first cylinder;

a plunger slidably mounted in the first cylinder, the plunger being moved by a piezo-actuator in the first cylinder when a predetermined voltage is applied to the piezo-actuator to cause it to expand and contract;

a second cylinder being smaller in diameter than the first cylinder, communicating with the first cylinder;

a piston slidably mounted in the second cylinder;

a reservoir communicating with the first cylinder;

a hydraulic fluid received in the first and second cylinder and the reservoir, the viscosity of the hydraulic fluid being variable in response to electric fields to which the hydraulic fluid is subjected;

a fluid passage for compensating for thermal expansion/contraction of the hydraulic fluid, the fluid passage being provided between the first cylinder and the reservoir; and a voltage applying means for subjecting the hydraulic fluid in the fluid passage to a electric field in accordance with a voltage applying instruction for applying the voltage to the piezo-actuator.

According to a second aspect of the present invention, the above object of the present invention is accomplished by providing:

the piezo-actuator's displacement magnifying mechanism as set forth in the first aspect of the present invention, wherein:

the fluid passage is formed between the piston and a housing provided with the second cylinder; and the voltage applying means comprises an electrode provided in the housing.

According to a third aspect of the present invention, the above object of the present invention is accomplished by providing:

the piezo-actuator's displacement magnifying mechanism as set forth in the first aspect of the present invention, wherein:

the reservoir is disposed adjacent to the first cylinder;

the fluid passage is formed in a wall of the first cylinder; and the voltage applying means comprises an electrode provided in a wall of the first cylinder.

According to a fourth aspect of the present invention, the above object of the present invention is accomplished by providing:

the piezo-actuator's displacement magnifying mechanism as set forth in the first aspect of the present invention, wherein:

the fluid passage is so formed as to be a winding passage; and the voltage applying means comprises an electrode being disposed adjacent to the winding passage.

In the piezo-actuator's displacement magnifying mechanism of the present invention having the above construction, it is possible to appropriately compensate for thermal expansion/contraction of the hydraulic fluid in the fluid passage since the viscosity of the hydraulic fluid remains lowered in case that the hydraulic fluid is not subjected to the electric fields, i.e., in case that the voltage applying means applies no voltage to the electrode area of the mechanism.

In operation of the mechanism of the present invention, when the predetermined voltage is applied to the piezo-actuator of the mechanism in accordance with the voltage applying instruction.

In addition, in the mechanism of the present invention, in response to the voltage applying instruction issued from the voltage applying means to the piezo-actuator, a predetermined voltage is also applied to the electrode area (which is adjacent to the fluid passage of the hydraulic fluid) of the mechanism so that the hydraulic fluid in the passage is subjected to the electric fields. whereby the viscosity of the hydraulic fluid is increased in the passage to prevent the fluid from passing through the clearance between the piston and the second cylinder, which realizes the "ideal means for laying a restraint on hydraulic fluid movement only when the piezo-actuator is energized".

Consequently, in operation of the mechanism of the present invention, such ideal means enables the first and the second cylinder of the mechanism to keep the hydraulic fluid (which is confined in the first and the second cylinder) in desirable conditions required for an ideal variable-damping-force shock absorber.

The above object, additional objects, additional embodiments and advantages of the present invention will be clarified to those skilled in the art hereinbelow with reference to the following description and accompanying drawings illustrating preferred embodiments of the present invention according to principles of the present invention.

DESCRIPTION OF THE PREFERRED EMBODIMENTS

Hereinbelow, preferred embodiments of the present invention will be described in detail with reference to the accompanying drawings.

Figure 1:
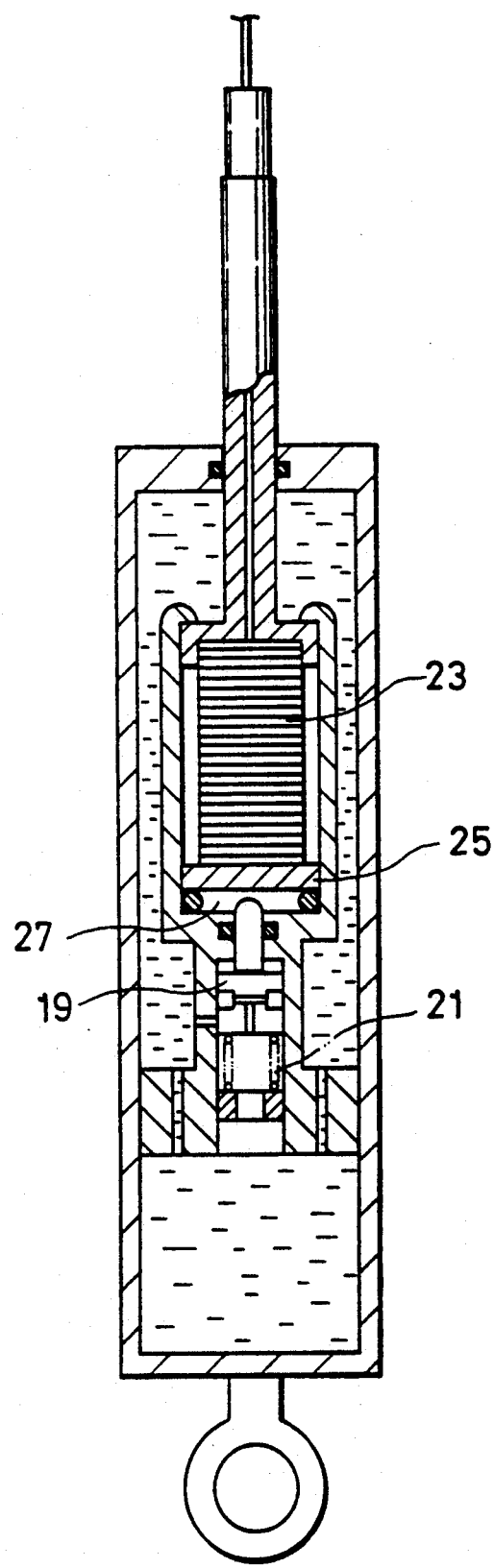
FIG. 1 is a longitudinal sectional view of the variable-damping-force shock absorber in which the conventional piezo-actuator's displacement magnifying mechanism is incorporated.
Figure 2:
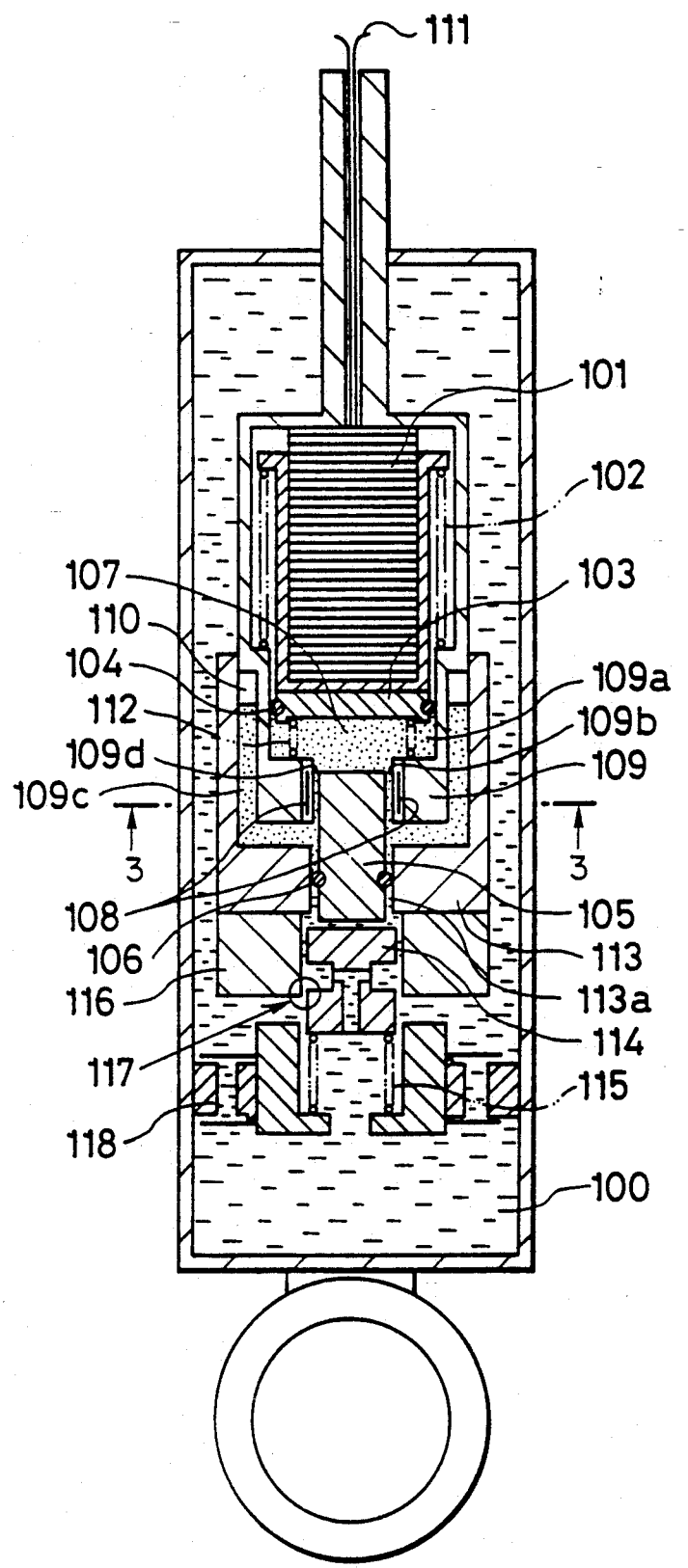
FIG. 2 is a longitudinal sectional view of the variable-damping-force shock absorber in which a piezo-actuator's displacement magnifying mechanism of the present invention is incorporated.
Figure 3:
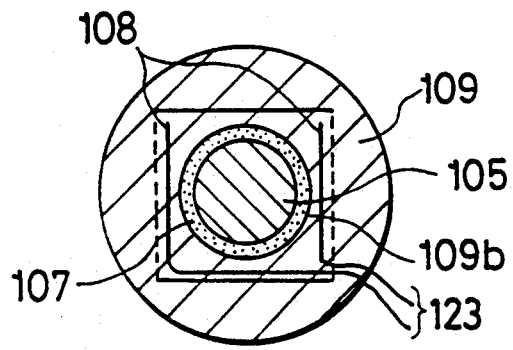
FIG. 3 is a cross-sectional view of the shock absorber of the present invention, taken along the line A—A of FIG. 2.

A preferred embodiment of a piezo-actuator's displacement magnifying mechanism of the present invention is shown in FIGS. 2 to 4 in which the mechanism of the present invention is incorporated in a variable-damping-force shock absorber.

Now, with reference to FIG. 2, the piezo-actuator's displacement magnifying mechanism of the present invention will be described. In FIG. 2, the reference numeral 101 denotes a piezo-actuator of a laminated type. A plunger 103 is mounted on a bottom of the piezo-actuator 101.

In operation, when a predetermined high voltage (for example, 500 volts) is applied to the piezo-actuator 101 through a cable 111, the piezo-actuator 101 slightly expands longitudinally or vertically as viewed in FIG. 2 by a predetermined distance (for example, 50 microns). After that, when the piezo-actuator 101 is released from the application of the voltage, the piezo-actuator 101 tends to return to its initial length.

A return spring 102 (which is so disposed under the plunger 103 as to urge the same 103 upward) supports the above returning tendency of the piezo-actuator 101. Since the mechanism of the present invention has the above construction, in operation, the plunger 103 is slidably moved up and down in a first cylinder 109a (which is formed in a housing 109) as the piezo-actuator 101 expands and contracts. A clearance between the plunger 103 and the first cylinder 109a is stopped up with an O-ring 104 mounted on the plunger 103 so that a hydraulic fluid 107 is hermetically sealed in the first cylinder 109a.

A piston 105, which is made of insulating material, is slidably mounted in both of a second cylinder 109b (which is formed in the housing 109) and a third cylinder 113a (which is formed in a holder 113 while axially aligned with the second cylinder 109b). In the housing 109, the second cylinder 109b is smaller in diameter than the first cylinder 109a while coaxially arranged with the same 109a.

A clearance 109d between the piston 105 and the second cylinder 109b is so set as to be, for example, approximately 30 microns in a diametrical direction of the piston 105, so that the hydraulic fluid 107 (which is confined in the first cylinder 109a) is permitted to easily pass through the clearance 109d when the hydraulic fluid 107 expands and contracts under the influence of variation in thermal condition of the fluid 107. Namely, in operation of the above embodiment of the mechanism of the present invention shown in FIG. 2, the clearance 109d serves as a fluid passage for compensating for thermal expansion/contraction of the hydraulic fluid 107 confined in the first cylinder 109a.

On the other hand, as is clear from FIG. 2, a clearance between the piston 105 and the third cylinder 113a is stopped up with an O-ring 106 (which is mounted on the piston 105) to prevent the hydraulic fluid 107 from passing therethrough. In operation, under the influence of electric fields, the hydraulic fluid 107 is variable in viscosity. Namely, in the above embodiment of the present invention shown in FIG. 2, when the hydraulic fluid 107 is subjected to the electric fields, the viscosity of the fluid 107 increases. As is clear from FIG. 2, the hydraulic fluid 107 is filled in each of the first cylinder 109a and the second cylinder 109b of the housing 109. The remaining amount of the hydraulic fluid 107 is received in a reservoir 109c through the clearance 109d between the piston 105 and the second cylinder 109b. The reservoir 109c is defined by: the housing 109, holder 113 and the piston 105, and has its upper area filled with a suitable pressure gas 110 such as an air under a normal atmospheric pressure, a low-pressure nitrogen gas or like gases. In operation, the thus gas-filled upper area of the reservoir 109c serves as a kind of absorber or accumulator for compensating for thermal expansion/contraction of the hydraulic fluid 107.

On the other hand, embedded in the second cylinder 109b of the housing 109 are a pair of electrodes 108 which produce electric fields in an electrode area of the second cylinder 109b when a predetermined voltage is applied to the electrodes 108. In operation, the hydraulic fluid 107, which is in the clearance 109d between the piston 105 and the second cylinder 109b, is subjected to the electric fields thus produced by the electrodes 108. The pair of the electrodes 108 constitute a voltage applying means for producing the electric fields to which the hydraulic fluid 107 is subjected. Arrangement of the voltage applying means or electrodes 108 is shown in FIGS. 2 and 3 which is a cross-sectional view of the electrode area of the second cylinder 109b, taken along the line A—A of FIG. 2. As is clear from these figures, each of the piston 105 and a part of the second cylinder 109b sandwiched between the pair of the electrodes 108 is made of insulating material, so that the hydraulic fluid 107 is effectively subjected to the electric fields produced by these electrodes 108. The electrodes 108 are connected with a suitable electric power source through a pair of wires 123.

As shown in FIG. 2, a spool valve 114 is disposed under the piston 105, while urged upward by a compression spring 115 so as to be brought into a close contact with a bottom of the piston 105. In operation, when the spool valve is displaced, a fluid path 117 of the spool valve 116 is opened and closed. When the fluid path 117 of the spool valve 116 is closed, a damping force exerted by the shock absorber shown in FIG. 2 increases since the spool valve 116 prevents an operating oil (which is confined in an oil chamber 100) from bypassing a damping valve 118 of the shock absorber. On the contrary, when the fluid path 117 of the spool valve 116 is opened, the spool valve 116 permits the operating oil to bypass the damping valve 118 so that the damping force exerted by the shock absorber decreases.

Now, operation of the piezo-actuator's displacement magnifying mechanism of the present invention having the above construction will be described in detail.

In a condition in which a vehicle (not shown) carrying the variable-damping-force shock absorber of the present invention travels upon a good-condition road, it is desirable to increase the damping force exerted by the shock absorber. Consequently, in the above condition, no voltage is applied to the cable 111 connected with the piezo-actuator 101 of the shock absorber. At the same time, no voltage is applied to the pair of the electrodes 108 so that the hydraulic fluid 107 (which is in the clearance 109d between the piston 105 and the second cylinder 109b) is free from any electric field, whereby the viscosity of the hydraulic fluid 107 in the clearance 109d stays low. Under such circumstances, even when ambient temperature changes to cause thermal expansion/contraction of the hydraulic fluid 107, the clearance 109d compensates for such thermal expansion/contraction of the hydraulic fluid 107 since the clearance 109d permits the hydraulic fluid 107 (the viscosity of which stays low) to easily pass therethrough. Consequently, in the above condition, it is possible to constantly keep the hydraulic fluid 107 (which is confined in the first cylinder 109a and the second cylinder 109b) at low pressure.

Under such circumstances, when a suitable road-condition sensor (not shown), which is mounted on the vehicle carrying the variable-damping-force shock absorber of the present invention shown in FIG. 2, suddenly detects some bumps on the road, the sensor immediately issues a detection signal on the basis of which: a predetermined voltage, for example, a voltage of several hundreds volts is immediately applied to the piezo-actuator 101 to longitudinally expand the same 101 so that the plunger 103 is moved or displaced downward by a predetermined distance or displacement L1, for example, a displacement of several tens microns in the first cylinder 109a to develop a predetermined pressure in the hydraulic fluid 107 confined in the first cylinder 109a. The thus developed pressure immediately moves or displaces the piston 105 downward by a predetermined distance or displacement L2 which is substantially A1/A2 times as much as that L1 of the plunger 103 (wherein: A1 is a substantial area of the plunger 103 subjected to the hydraulic fluid 107; and A2 is that of the piston subjected to the hydraulic fluid 107 in the first cylinder 109a; and, therefore the A1/A2 constitutes an area ratio). The above reference characters L1, L2, A1 and A2 are not shown in the drawings.

As is clear from the above, it is possible for the piezo-actuator's displacement magnifying mechanism of the present invention to immediately magnify the displacement or of the piezo-actuator to a desired extent. For example, in case that an area ratio of the A1/A2 is 40/1 and the displacement L1 of the plunger 103 is 50 microns, the displacement L2 of the piston 105 becomes substantially 2 mm.

In coincident with the above application of the voltage to the piezo-actuator 101, based on the same detection signal issued from the sensor (not shown), a predetermined voltage is applied to the pair of the electrodes 108 in the electrode area of the second cylinder 109b of the housing 109 to produce predetermined electric fields in an area sandwiched between the pair of the electrodes 108, so that the hydraulic fluid 107 in the clearance 109d is subjected to the thus produced electric fields to have its viscosity increased, whereby flow or motion of the hydraulic fluid 107 passing through the clearance 109d is restricted so as to keep the hydraulic fluid 107 (which is confined in the first cylinder 109a and the second cylinder 109b) at high pressure.

In operation, in case that no voltage is applied to the electrodes 108 so that the hydraulic fluid 107 is not subjected to any electric field in the clearance 109d, the piston 105 returns to its initial position in a short period of time, for example, in two seconds after the vehicle clears the bumps on the road. In contrast with this, for example, when the hydraulic fluid 107 in the clearance 109d is subjected to an electric field of 2 kV/mm, the viscosity of the fluid 107 becomes approximately ten times as much as that of the fluid 107 free from any electric field. In other words, the thus produced electric field of 2 kV/mm reduces a flow rate of the fluid 107 (which passes through the clearance 109d in the electric field) to the extent of approximately 1/10 of that of the hydraulic fluid 107 passing through the clearance 109d free from any electric field. As a result, the piston 105 requires a relatively long period of time, i.e., approximately 20 seconds to return to its initial position, which solves the problem of returning the piston 105 to its initial position in a short period of time.

As described above, when the vehicle clears the pumps on the rough road, it is possible for the variable-damping-force shock absorber (in which the piezo-actuator's displacement magnifying mechanism of the present invention is incorporated) to keep its damping force low, without using: any elastic member which is poor in durability; and any control unit (which is expensive and poor in reliability) for additionally applying a predetermined voltage to the piezo-actuator (101) so as to compensate for leakage of the hydraulic fluid (107) passing through the clearance (109d) as is in the case of the conventional method described above.

In the vehicle carrying the shock absorber of the present invention, after the vehicle clears the bumps on the rough road, the piezo-actuator 101 of the shock absorber is immediately released from the application of the voltage so as to increase the damping force of the shock absorber. Namely, in operation, when the piezo-actuator 101 is released from the application of the voltage, the actuator 101 tends to contract. This tendency is enhanced by the return spring 102. At the same time, the plunger 103 begins to return to its initial position under the influence of a resilient force exerted by the compression spring 112, so that a pressure of the hydraulic fluid 107 confined in the first cylinder 109a reduces. Consequently, both of the piston 105 and the spool valve 114 are released from the pressure of the hydraulic fluid 107, and return to their initial positions under the influence of resilient force exerted by the another compression spring 115. As a result, the fluid path 117 of the spool valve 114 is closed to prevent the hydraulic fluid 107 from bypassing the damping valve 118 of the shock absorber, so that the damping force of the absorber increases.

In this case, when the application of the voltage to the piezo-actuator 101 is stopped in coincidence with the stoppage of application of the voltage to the pair of the electrodes 108, the leakage of the hydraulic fluid 107 passing through the clearance 109d increases, which makes it possible to compensate for thermal expansion/contraction of the hydraulic fluid 107 confined in the first cylinder 109a.

In the above description, action and effects of the variable-damping-force shock absorber (in which the piezo-actuator's displacement magnifying mechanism of the present invention is incorporated) have been described. However, the application of the mechanism of the present invention is not limited to the shock absorber. Namely, the mechanism of the present invention is also applicable to other apparatuses such as industrial hydraulic control valves.

Figure 4A:
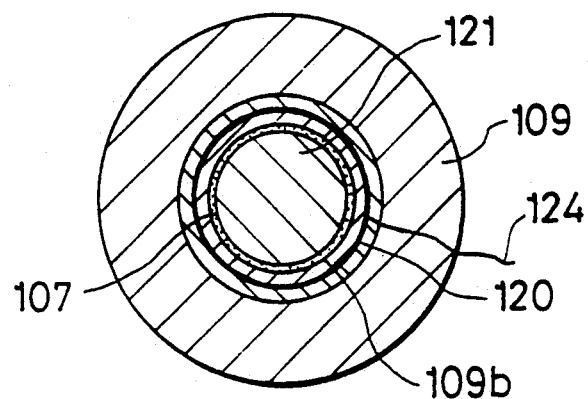
FIG. 4A is a cross-sectional view of an electrode area of a first modification of the shock absorber of the present invention shown in FIGS. 2 and 3, taken along the line B—B of FIG. 4B.
Figure 4B:
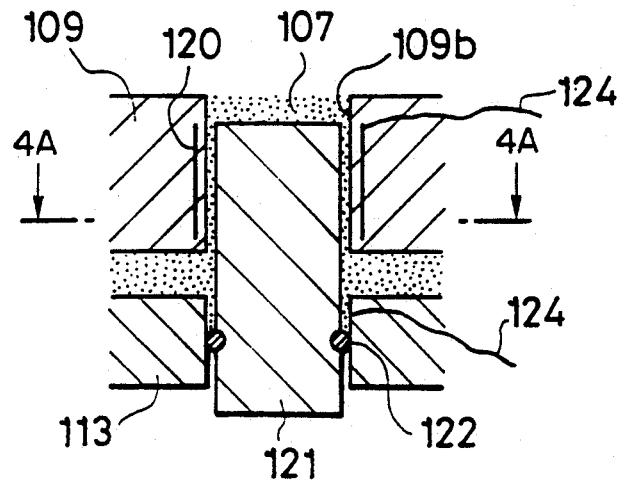
FIG. 4B is a longitudinal sectional view of the first modification of the shock absorber of the present invention shown in FIGS. 2 and 3.

FIGS. 4A and 4B show a first modification of the electrode portion of the variable-damping-force shock absorber of the present invention shown in FIGS. 2 and 3. FIG. 4A is a cross-sectional view of the first modification shown in FIG. 4B, and corresponds to FIG. 3 of the shock absorber shown in FIG. 2.

In the first modification shown in FIGS. 4A and 4B, a piston 121 (corresponding to the piston 105 of the shock absorber shown in FIG. 2) is made of conductive material to form one of a pair of electrodes 121, 120 corresponding to the electrodes 108 of the shock absorber shown in FIG. 2. The other one 120 of the electrodes 121, 120 is concentrically embedded in the second cylinder 109b to minimize a gap between the electrodes 121, 120. This gap is extremely small in comparison with that between the electrodes 108 shown in FIG. 2, to make it possible to produce a strong electric fields (to which the hydraulic fluid 107 is subjected in the gap) upon application of a relatively low voltage to the electrodes 121, 120.

Mounted on the piston 121 is an O-ring 122 made of conductive rubber.

In operation, for example, in case that: a gap between the piston or electrode 121 and the second cylinder 109b is approximately 30 microns in diameter (i.e., approximately 15 microns in radius); and an insulating layer (through which the embedded electrode 120 is spaced apart from the hydraulic fluid 107) forming a part of the second cylinder 109b has a thickness of 85 microns, a gap between the electrode 120 and the piston 121 is approximately 0.1 mm. Consequently, it is possible for the modification shown in FIGS. 4A and 4B to produce the above-mentioned electric field of 2 kV/mm by applying only a voltage of 200 volts to the electrodes 121, 120. In operation of the shock absorber of the present invention in which the modification shown in FIGS. 4A and 4B is incorporated, since the same voltage (i.e., 200 volts) as that supplied to the electrodes 121, 120 from a suitable high-voltage unit (not shown) is required to energize the piezo-actuator 101, it is possible for the piezo-actuator 101 to share the above high-voltage unit (not shown) with the electrode 121, 120 in operation. Required voltage (i.e., 200 volts) supplied from the high-voltage unit is applied to the electrodes 121, 120 through a pair of wires 124 as shown in FIG. 4A and 4B.

In the variable-damping-force shock absorber of the present invention, it is also possible to replace the hydraulic fluid 107 (which has its viscosity varied under the influence of electric fields) with a conventional high-viscosity thermal sensitive working fluid (which has its viscosity varied under the influence of ambient temperature), provided that: such conventional working fluid is capable of changing its viscosity on the order of several milliseconds.

On the other hand, in case that the same voltage is applied to the piezo-actuator 101 and the electrodes 108, or 121 and 120 (hereinafter referred to as the 108 only to avoid redundancy in description) simultaneously, it is also possible for the piezo-actuator 101 to share other circuit components (for example, such as a power transistor unit, harnesses and the like in addition to the above high-voltage unit) with the electrodes 108, which makes it possible to considerably save the manufacturing cost of required driving/control circuits of the variable-damping-force shock absorber of the present invention.

In contrast with the above, in case that the voltage is applied to the piezo-actuator 101 and the electrodes (108, or 121 and 120) sequentially so that the voltage is first applied to the electrodes 108, it is possible to minimized a leakage of the hydraulic fluid 107 passing through the clearance 109d between the piston 105 (or 121 forming the electrode in the modification) and the second cylinder 109b. In this case, when the voltage is first applied to the piezo-actuator 101, it is possible to prevent the responsibility of the shock absorber of the present invention from being impaired since viscous resistance to the expansion of the piezo-actuator 101 increases due to an increment in the viscosity of the hydraulic fluid 107. As is clear from the above description, it is possible for the present invention to adequately modify the order of the application of the voltage to the piezo-actuator 101 and the electrodes 108, depending on required apparatuses in which the piezo-actuator's displacement magnifying mechanism of the present invention is incorporated.

Figure 5A:
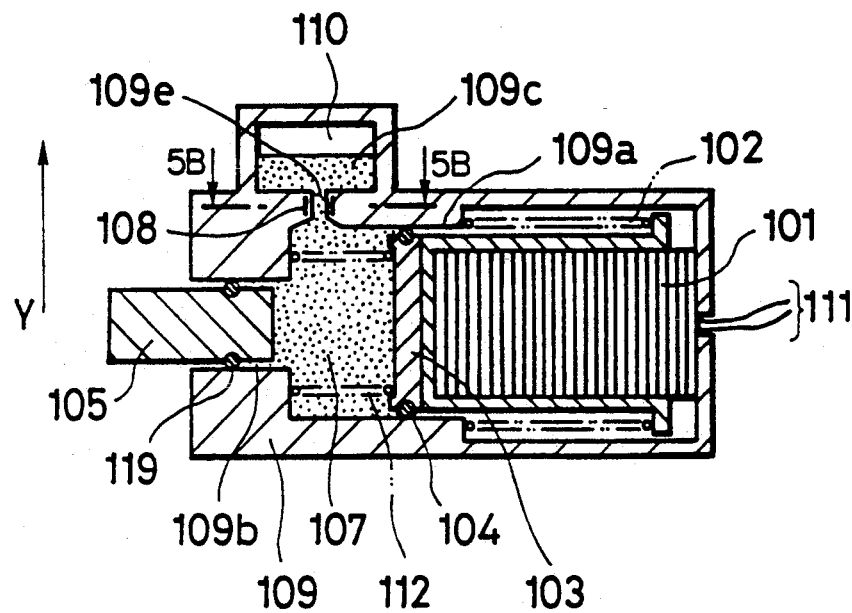
FIG. 5A is a longitudinal sectional view of a second modification of the shock absorber of the present invention shown in FIGS. 2 and 3.
Figure 5B:
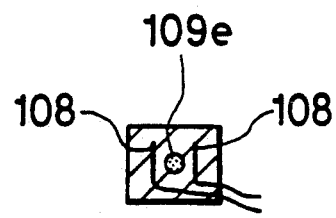
FIG. 5B is a cross-sectional view of an essential part of the second modification of the shock absorber of the present invention shown in FIGS. 2 and 3, taken along the line C—C of FIG. 5A.

FIGS. 5A and 5B show a second modification of the electrode area of the variable-damping-force shock absorber of the present invention shown in FIG. 2. FIG. 5B is a cross-sectional view of the second modification, taken along the line C—C of FIG. 5A illustrating in detail the piezo-actuator's displacement magnifying mechanism of the present invention.

In construction of the second modification of the present invention shown in FIG. 5A, a reservoir 109c of the hydraulic fluid 107 is formed in an uppermost portion of the housing 109 which extends laterally in the modification. An arrow Y is oriented upward as viewed in FIG. 5A. The reservoir 109c communicates with the first cylinder 109a through a thin fluid passage 109e is used in operation to compensate for thermal expansion/contraction of the hydraulic fluid 107 confined in the first cylinder 109a. In operation, the hydraulic fluid 107 existing in the thin passage 109e is subjected to electric fields produced by a pair of the electrodes 108 which are oppositely disposed in diameter from each other so as to sandwich the thin fluid passage 109e therebetween as shown in FIG. 5B. A clearance between the piston 105 and the second cylinder 109b is stopped up with an O-ring 119 so as to hermetically seal the second cylinder 109b. The remaining construction of the second modification of the present invention shown in FIGS. 5A and 5B such as that of the piezo-actuator 101 is substantially the same as that of the embodiment of the present invention shown in FIGS. 2 and 3.

In operation, when the voltage is applied to both of the piezo-actuator 101 and the electrodes 108 simultaneously, the viscosity of the hydraulic fluid 107 existing in the thin fluid passage 109e increases so that both of the first cylinder 109a and the second cylinder 109b are substantially hermetically sealed with the O-rings 104, 119 and the hydraulic fluid 107 existing in the thin fluid passage 109e, whereby the hydraulic fluid 107 is substantially hermetically sealed in these cylinders 109a, 109b to keep the piston 105 stationary.

In contrast with the above, when no voltage is applied to the piezo-actuator 101, the pair of the electrodes 108 are also released from the application of the voltage to permit the hydraulic fluid 107 to easily pass through the thin fluid passage 109e, which makes it possible to compensate for thermal expansion/contraction of the hydraulic fluid 107 confined in the cylinders 109a, 109b. In the construction of the second modification of the present invention shown in FIG. 5A, since the thin fluid passage 109e is disposed over both of the first cylinder 109a and the second cylinder 109b, it is possible to prevent any gas such as air from remaining in these cylinders 109a, 109b in operation. Such gas remaining in the cylinders 109a, 109b results in a fatal failure of the mechanism of the second modification of the present invention shown in FIG. 5A.

As described above, it is possible for the second modification of the present invention having the above construction: to compensate for thermal expansion/contraction of the hydraulic fluid 107 confined in the cylinders 109a, 109b; to remove the gas from the cylinders 109a, 109b through the passage 109e; and to ensure that the displacement of the piezo-actuator 101 is effectively magnified without fail. Consequently, in manufacturing, it is not required: to remove gases dissolved in the hydraulic fluid 107 from the same 107; and to remove gases such as air and the like from the cylinders 109a, 109b. This results in considerable saving in required manufacturing cost.

As is clear form FIG. 5B, it is possible to minimize a gap between the electrodes 108 in the second modification of the present invention shown in FIG. 5A as is in he embodiment of the present invention shown in FIG. 2. Consequently, it is possible for the second modification of the present invention to have their electrodes 108 produce an intense electric fields with the application of a possible minimum voltage to the electrodes 108.

Figure 6A:
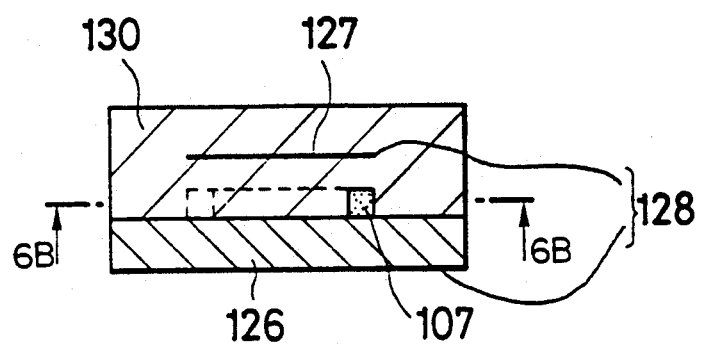
FIG. 6A is a cross-sectional view of an electrode area of a third modification of the shock absorber of the present invention shown in FIGS. 2 and 3.
Figure 6B:
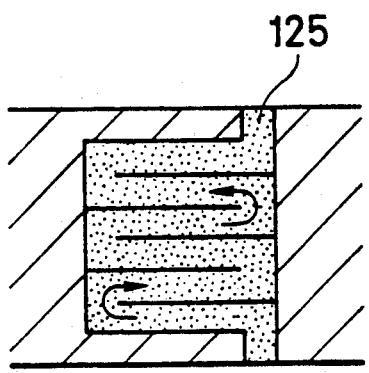
FIG. 6B is a longitudinal sectional view of a hydraulic fluid passage disposed in the electrode area of the third modification of the shock absorber of the present invention shown in FIGS. 2 and 3, taken along the line D—D of FIG. 6A.

Further, it is possible for the second modification of the present invention to form the thin fluid passage 109e at a desirable position in the housing 109. Consequently, it is possible for the passage 109e to assume any shape such as complicated one 125 shown in FIGS. 6A and 6B in which the thin fluid passage 125 assumes a winding shape. FIG. 6B is a cross-sectional view of the passage 125, taken along the line D—D of FIG. 6A. As is clear from FIG. 6A, an electrode 127 of a pair of electrodes 126, 127 (which correspond to the electrodes 108 shown in FIG. 2) is embedded in a half 130 (which is made of insulating material) of a housing (126, 130). In this housing (126, 130), the thin fluid passage 125 is formed.

On the other hand, the other one 126 of the electrodes 126, 127 forms the other half 126 of the housing (130, 126), which half 126 is integrally combined with or bonded to the half 130 to form the housing (126, 130). Consequently, it is possible for the present invention shown in FIGS. 6A and 6B to have the hydraulic fluid 107; confined in such elongated thin fluid passage 125; and effectively subjected to the electric field produced by the electrodes 126 and 127, one 127 of which is minimized in heat capacity and volume. This ensures that the first cylinder 109a and the second cylinder 109b hold the hydraulic fluid 107 therein in optimum conditions. As shown in FIG. 6A, the voltage is applied to the electrodes 126, 127 through a pair of wires 128.

Further, in operation, in contrast with the embodiment of the present invention shown in FIG. 2, it is possible for the mechanism of the present invention having the above construction shown in FIGS. 6A to apply first the voltage to the electrode 126, 126 (which correspond to the electrodes 108 shown in FIG. 2) so as to minimize a leakage of the hydraulic fluid 107 passing through the thin passage 125, since there is no fear that the responsibility of the mechanism of the present invention shown in FIG. 6A is impaired under the influence of the hydraulic fluid 107 having been subjected to the electric fields.

In addition, in the mechanism of the present invention having the construction shown in FIGS. 5A, 5B, it is also possible to form the thin fluid passage 109e in the plunger 103 instead of in the housing 109, which makes it possible to apply the mechanism of the present invention shown in FIG. 5A to a variable-damping-force shock absorber and like apparatus.

What is claimed is:

1. A piezo-actuator's displacement magnifying mechanism, comprising:
   a first cylinder;
   a plunger slidably mounted in said first cylinder, said plunger being moved by a piezo-actuator in said first cylinder when a predetermined voltage is applied to said piezo-actuator to cause it to expand and contract;
   a second cylinder in communication with said first cylinder and being smaller in diameter than said first cylinder so as to magnify displacement of said plunger by a difference in a pressure receiving area between the first and second cylinders;
   a piston slidably mounted in said second cylinder, being smaller in diameter than said plunger;
   a reservoir communicating with said first cylinder;
   a hydraulic fluid received in said first and second cylinder and said reservoir, the viscosity of said hydraulic fluid being variable in response to electric fields to which said hydraulic fluid is subjected;
   a fluid passage for compensating for thermal expansion/contraction of said hydraulic fluid, said fluid passage being provided between said first cylinder and said reservoir; and
   a voltage applying means for subjecting said hydraulic fluid in said fluid passage to an electric field in accordance with a voltage applying instruction for applying the voltage to said piezo-actuator.

2. The piezo-actuator's displacement magnifying mechanism according to claim 1, wherein:
   said fluid passage is formed between said piston and a housing; and
   said voltage applying means comprises an electrode provided in said housing.

3. A piezo-actuator's displacement magnifying mechanism, comprising:
   a first cylinder;
   a plunger slidably mounted in said first cylinder, said plunger being moved by a piezo-actuator in said first cylinder when a predetermined voltage is applied to said piezo-actuator to cause it to expand and contract;
   a second cylinder being smaller in diameter than said first cylinder, communicating with said first cylinder;
   a piston slidably mounted in said second cylinder;
   a reservoir communicating with said first cylinder, said reservoir being disposed adjacent to said first cylinder;
   a hydraulic fluid received in said first and second cylinders and said reservoir, the viscosity of said hydraulic fluid being variable in response to electric fields to which said hydraulic fluid is subjected;
   a fluid passage for compensating for thermal expansion/contraction of said hydraulic fluid, said fluid passage being provided between said first cylinder and said reservoir, said fluid passage being formed in a wall of said first cylinder; and
   a voltage applying means for subjecting said hydraulic fluid in said fluid passage to an electric field in accordance with a voltage applying instruction for applying the voltage to said piezo-actuator, said voltage applying means having an electrode provided in the wall of said first cylinder.

4. A piezo-actuator's displacement magnifying mechanism, comprising:
   a first cylinder;
   a plunger slidably mounted in said first cylinder, said plunger being moved by a piezo-actuator in said first cylinder when a predetermined voltage is applied to said piezo-actuator to cause it to expand and contract;
   a second cylinder being smaller in diameter than said first cylinder, communicating with said first cylinder;
   a piston slidably mounted in said second cylinder;
   a reservoir communicating with said first cylinder;
   a hydraulic fluid received in said first and second cylinders and said reservoir, the viscosity of said hydraulic fluid being variable in response to electric fields to which said hydraulic fluid is subjected;
   a fluid passage for compensating for thermal expansion/contraction of said hydraulic fluid, said fluid passage being provided between said first cylinder and said reservoir, said fluid passage including a winding passage; and
   a voltage applying means for subjecting said hydraulic fluid in said fluid passage to an electric field in accordance with a voltage applying instruction for applying the voltage to said piezo-actuator, said voltage applying means having an electrode being disposed adjacent to said winding passage.

* * * * *